July 17, 1951  H. H. CLARK  2,561,012
APPARATUS FOR VENTING TIRE CASINGS
Filed March 26, 1949  4 Sheets-Sheet 2

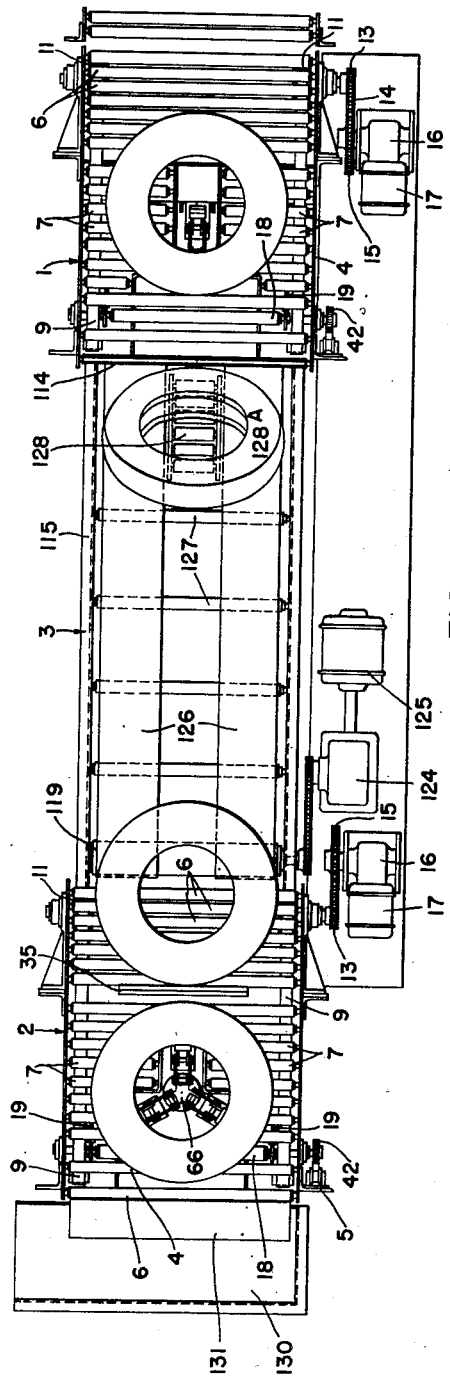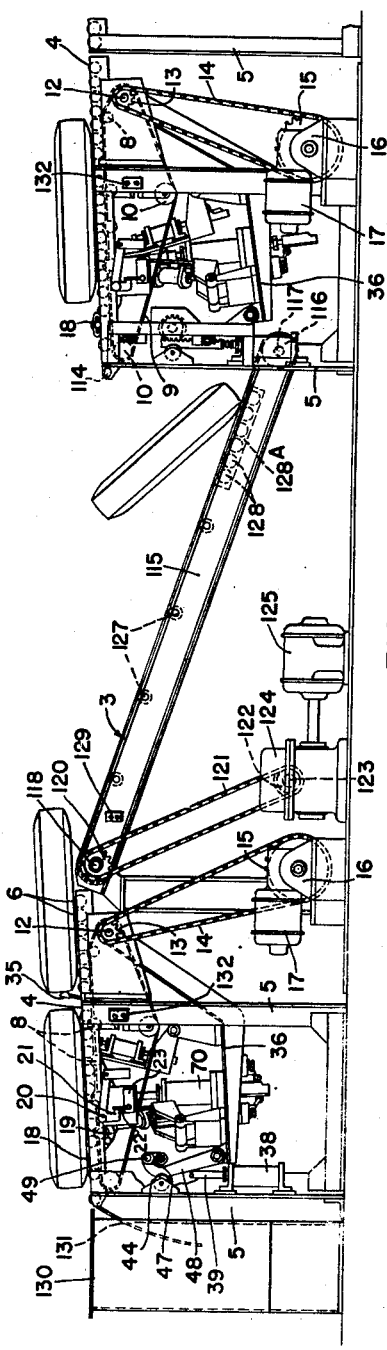

INVENTOR.
HAROLD H. CLARK
BY
*RH Waters*
ATTORNEY

July 17, 1951    H. H. CLARK    2,561,012
APPARATUS FOR VENTING TIRE CASINGS
Filed March 26, 1949    4 Sheets-Sheet 3

*INVENTOR.*
HAROLD H. CLARK
BY
*R H Waters*
ATTORNEY

July 17, 1951     H. H. CLARK     2,561,012
APPARATUS FOR VENTING TIRE CASINGS
Filed March 26, 1949     4 Sheets-Sheet 4
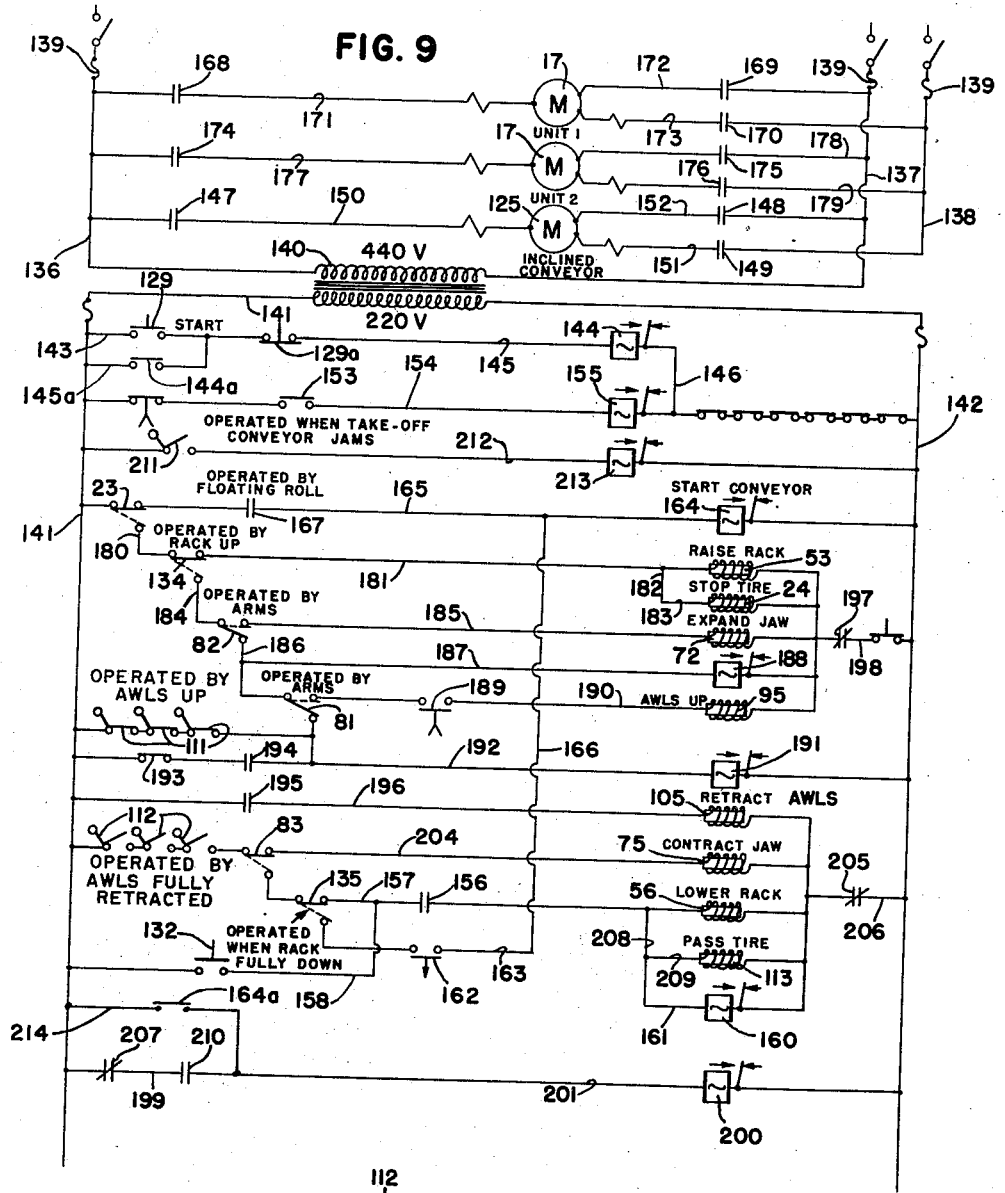
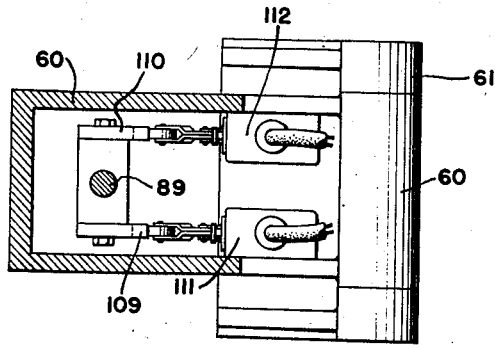
FIG. 8
INVENTOR.
HAROLD H. CLARK
BY
ATTORNEY Patented July 17, 1951

2,561,012

UNITED STATES PATENT OFFICE 2,561,012

APPARATUS FOR VENTING TIRE CASINGS

Harold H. Clark, Cuyahoga Falls, Ohio, assignor to Wingfoot Corporation, Akron, Ohio, a corporation of Delaware Application March 26, 1949, Serial No. 83,734

20 Claims. (Cl. 164—90)

The present invention relates to an apparatus for the manufacture of automobile tires and the like and particularly to an apparatus for venting the sidewalls of a finished pneumatic tire casing to permit the escape of air that becomes trapped between the inner walls of a tire carcass and the inner tube and rim surfaces when mounted on a wheel or rim and inflated.

The air trapped between the inner surface of the tire casing and the surfaces of the tube and rim is under pressure approximately equal to the inflating pressure of the mounted tire, and if permitted to remain may cause serious damage to the tire casing in the form of tread and ply separations. Tire casings are usually composed of several plies of rubberized cord fabric. The inner surface of the carcass presents a corduroy-like surface. The trapped air flows through the grooves and may penetrate through one or more plies, forming an air blister which grows to such proportions that premature wear and destruction is the result when trapped air is permitted to remain therein.

Previously this venting has been done by hand. The operators stand beside a conveyor and as the tires pass they are pierced with awls in the hands of the operators. The hand piercing is laborious and tiresome to the operators' arms, especially the wrists, and also requires a substantial number of operators to pierce the large volume of tires as they pass by on the conveyors.

It has been found advantageous to pierce the tires at three equally spaced points on each side about the circumference of the tire casings adjacent the bead portions. The venting by the present invention is accomplished by power driven awls of small diameter without affecting normal wear of tires. The vent-forming awls remove no material from the tire casings. When the awls are withdrawn the walls of the vents retract, permitting trapped air under pressure to escape from within the casing but will prevent air moisture or other matter from entering therein.

An object of the present invention is to provide an apparatus that will automatically pierce the tires to provide vents therein positively and accurately, with a saving in time and labor and at less cost.

Another object is to provide an apparatus that will operate in conjunction with a conventional feeding conveyor to form vents in one side of the tires, turn the tire over, deliver said tires to a second unit which will form vents in the opposite side of the tires, then release the tires to a second take-away conveyor, all of which is performed automatically with efficiency and dispatch without interrupting the regular scheduled flow of tires.

The aforesaid objects of the invention and other objects will become apparent as the description proceeds, and are achieved by providing an apparatus comprising a pair of units of similar construction and operation connected by an inclined conveyor unit to carry tires from the first unit to the second unit. The first unit comprises means for receiving and positioning a tire, fluid pressure means for actuating a plurality of arms to center and hold a tire, awls associated therewith to pierce the under side of a tire and means associated with the said first unit to turn or reverse a tire upside down onto an inclined conveyor unit to be delivered to said second unit where the tire is centered, held and pierced in the opposite side, then released to a take-away conveyor.

For a better understanding of the invention, reference should be had to the accompanying drawings wherein:

Figure 1 is a plan view of one embodiment of the invention;

Figure 2 is a side elevation of the apparatus;

Figure 8 is a sectional view taken on the line 8—8 of Figure 6 showing the switches and cam bars for operating the awls;

Figure 9 is a wiring diagram of the apparatus.

Figure 3:
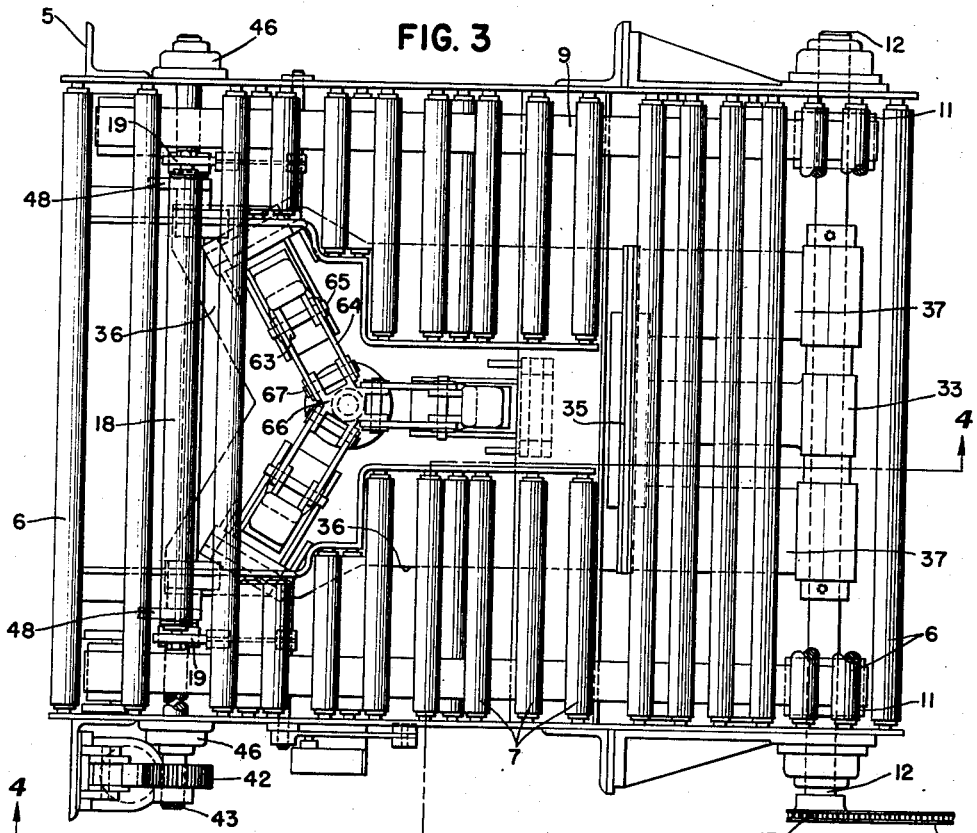
Figure 3 is an enlarged plan view of one of the vent piercing units.

With specific reference to the form of the invention illustrated in the drawings, the apparatus comprises a pair of units, the first unit being designated generally by the numeral 1 and a second unit indicated generally by the numeral 2 and an intermediate unit generally indicated by the numeral 3.

The units indicated generally by numerals 1 and 2 are of identical construction except for detail of their discharge ends which will later be explained, otherwise like reference characters will indicate like parts in both of said units.

Each unit comprises a roller conveyor 4 supported on a frame 5. The roller conveyor is positioned at a slight incline which is an aid in the forward movement of tires to the piercing mechanism which form the vents therein. Also, the conveyor is inclined to conform in height with the feed conveyor and to be in parallelism with the carriage which carries the piercing and holding mechanism into and out of actuating position.

As illustrated in Figures 1 to 4, the roller conveyor is provided with free revolving rolls 6 at the receiving and discharge ends but the intermediate rollers 7 are belt driven. This is accomplished by providing auxiliary rollers 8 beneath the rollers 7 and interpolated therewith so the belts 9 at each side can be interwoven between the rollers 7 and 8 to drive rollers 7 so that tires may be moved to a central position over the awl venting mechanism. The return side of the belts is guided by the rollers 10, said belts being driven by the pulleys 11 mounted on a shaft 12 which is driven by a sprocket 13 and chain 14 connected to a sprocket 15 mounted on a speed reduction unit 16 which in turn is driven by the motor 17.

The roller conveyor of each unit is driven intermittently in the following manner (see Figures 2, 4 and 6). When a tire has reached a position approximately centrally above the piercing unit, the tire contacts a swinging roller 18 which is normally held above the surface of the rollers 7 by a pair of arms 19 fixed to a pivoting shaft 20. The roller 18 is held in its upward position by a counterweight attached to the opposite end of an arm 30 also fixed to the shaft 20. When a tire contacts and depresses the roller 18, the arms 19 to which the roller is attached swing in a downward arc which causes a projection 21 formed on arm 30 to contact an arm 22 extending from a switch 23 which opens a circuit to the motor 17 to stop the conveyor. At the same time a relay energized by switch 23 closes a circuit which energizes a solenoid 24 (see Fig. 6) which actuates a valve 25, permitting fluid under pressure to flow through the conduit 26 to the lower end of a fluid pressure cylinder 27 which is pivotally mounted on a bracket 28 attached to cross member 29 of the frame 5. A piston rod 31 extending from a double acting piston 32 within the cylinder 27 extends to and is pivotally attached to an arm 33 which is pivotally mounted on the shaft 12. At the free end of the arm 33 a bar 34 extends upwardly therefrom and having attached to its upper end a half round bar member 35 which when pushed upward by the arm 33 actuated by the piston rod 31 serves as a stop to prevent succeeding tires from displacing a tire being vented.

Figure 4:
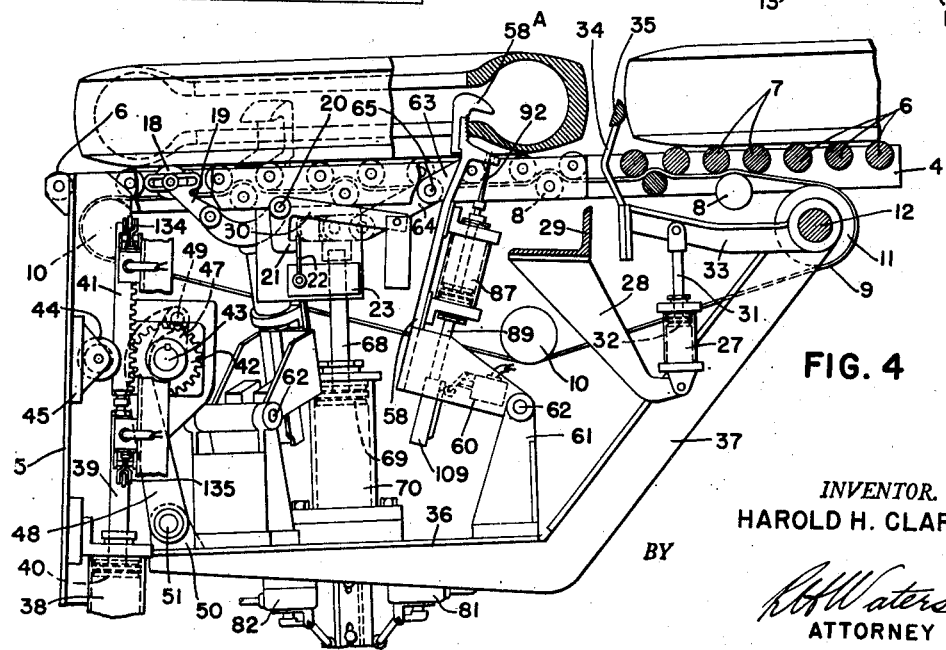
Figure 4 is a view partly in section taken on the line 4—4 of Figure 3.

When the tire is in position and the stop raised, the sidewall of the tire is pierced to form vents adjacent the bead portion of the tire by the mechanism now to be described which is clearly illustrated in Figures 3 and 4. The mechanism includes means by which the holding and piercing mechanism is raised and lowered into and out of position and in parallelism with the roller conveyor 4. It consists of a plate 36 which is in the general form of a Y as illustrated in dotted lines in Figure 3. The plate is supported by a pair of angular arms 37 hingedly mounted on the shaft 12 and carries the holding and piercing elements into and out of position.

The carriage is raised and lowered by a fluid pressure cylinder 38 mounted on the frame 5. A piston rod 39 actuated by a double acting piston 40 within the cylinder 38 has attached to the upper end thereof a rack 41 which, when driven up and down by the piston rod 39, drives a pinion gear 42 which is keyed to the shaft 43. The rack 41 is guided in its up and down course by a flanged roller 44 mounted in a bracket 45 attached to the frame 5. The shaft 43 is revolvably mounted in bearings 46 attached to the frame 5. Also keyed to the shaft 43, crank arms 47 extend to receive the upper ends of arms 48 which are pivoted thereto by pins 49. The arms 48 extend downwardly from the cranks to the plate 36 and are pivotally mounted in bearings 50 mounted on the plate 36, by pins 51. The upper ends of the arms 48 are curved to provide clearance between the arms and the shaft 43 to permit the pivot point of the cranks 47 and the upper ends of the arms 48 to pass beyond the axis of the shaft 43 which will permit the crank arms 47 to swing a sufficient distance to raise the holding and piercing mechanism into position.

Normally the fluid pressure in the cylinder 38 holds the mechanism in its raised position. Should the pressure fail, damage to the mechanism is prevented by the curved arms 48 permitting the pivot points of the arms and cranks 47 to swing beyond the axis of the shaft 43 to which the crank arms are keyed. This will prevent the crank arms swinging in the reverse arc and permit the arms 48 to contact the shaft 43 which will prevent a sudden drop of the holding and piercing mechanism, preventing damage thereto.

The tire centering, holding and piercing mechanism and the means for operating same are mounted on the plate 36. The mechanism is raised and lowered into and out of operating position through action of the cylinder 38 in cooperation with the rack 41 and pinion gear 42.

Figure 6:
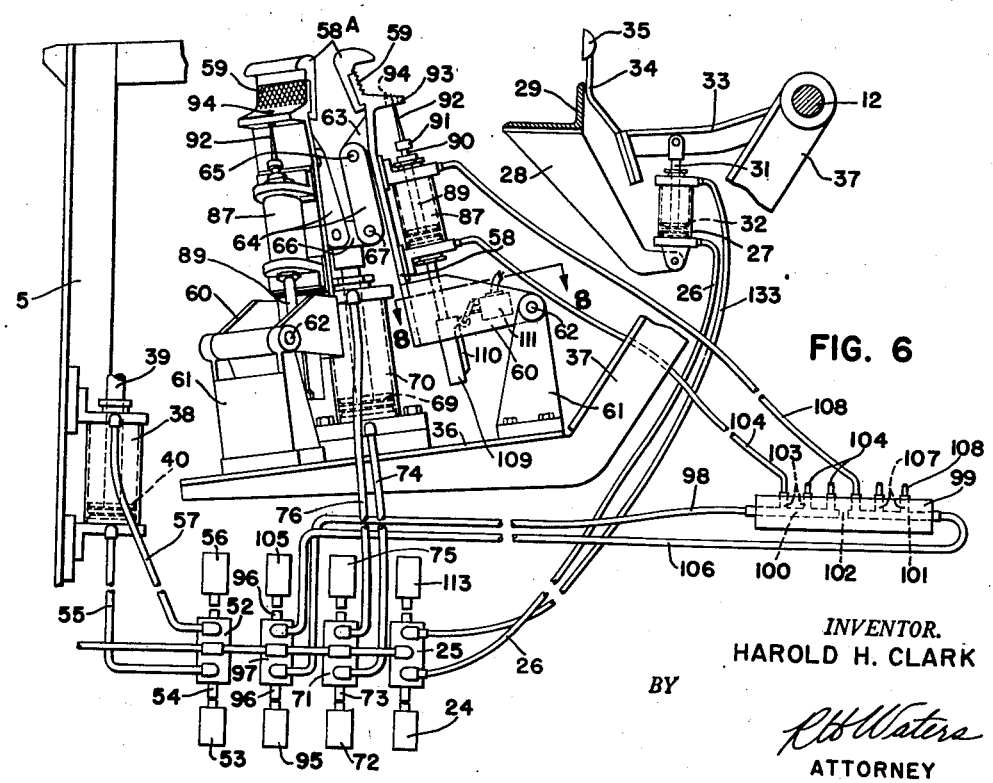
Figure 6 is a similar view showing the gripping arms and piercing means retracted, and the actuating means with fluid pressure connections.

The cylinder 38 is actuated by a solenoid operated 4-way valve 52 (see Fig. 6). When the mechanism is to be raised, through the proper electrical circuit, a solenoid 53 is energized which depresses the valve plunger 54. This permits fluid to enter the conduit 55 leading to the lower end of the cylinder 38 and opens the upper end to exhaust. To lower the mechanism the solenoid 56 is energized which reverses the valve 52 to permit fluid to pass through the conduit 57 to the upper end of the cylinder 38 and open the lower end to exhaust.

Figure 5:
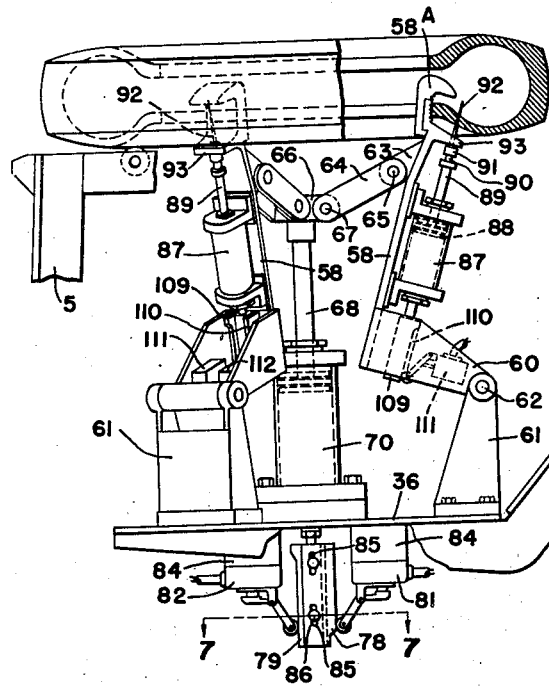
Figure 5 is a fragmentary view showing the holding and piercing means in operative position.

As best illustrated in Figures 4, 5 and 6, the tire engaging and centering mechanism comprise arms 58 having formed at their outer sides scored or knurled surfaces 59 for the purpose of gripping the inner bead surface of a tire to centrally locate the tire and to hold same to prevent slipping while being pierced. As an added safety feature, guards 58a are provided at the upper ends of the arms 58 to prevent possible damage to the tire and also to prevent a tire jam on the table conveyor 4 should the tire be improperly held by the scored surfaces 59 of the arms.

Extending from the lower ends of the arms 58 at right angle thereto, are arms 60, the ends of which are pivotally connected to pedestals 61 by pivot pins 62, the pedestals being securely mounted on the plate 36.

Extending from the back of the arms 58, lugs 63 have pivotally attached thereto links 64 by pivot pins 65. The links extend to and are pivotally connected to a spider block 66 by pivot pins 67. The spider block 66 is attached to a piston rod 68 which is secured to a double acting piston 69 operating within a fluid pressure cylinder 70 bolted to the carriage plate 36.

Fluid under pressure is admitted to the lower end of the cylinder 70 through the action of a solenoid operated 4-way valve 71. When the solenoid 72 is energized it depresses the valve plunger 73 which permits fluid under pressure to enter the lower end of the cylinder 70 through the conduit 74 and opens the upper end of the cylinder to exhaust. This actuates the piston 69, causing the piston rod 68 to raise the spider block 66. This actuates the links 64 which are pivotally connected to the spider block and the lugs 63 on the arms 58, through their toggle action, spread the arms to center and hold a tire while being pierced. The centering of the tire being accomplished during the spreading of the arms 58 which enter the inner circumferential opening of the tire in retracted position. The spreading of the arms moves the tires to a central position. The arms are retracted and lowered when the solenoid 75 is energized, which depresses the plunger 73 of the valve 71 which admits fluid under pressure to the upper side of the cylinder 70 through the conduit 76 and opens the lower end to exhaust.

Figure 7:
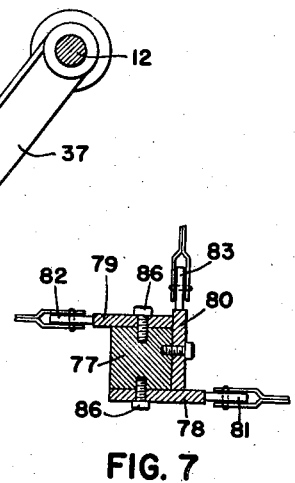
Figure 7 is a sectional view taken on the line 7—7 of Figure 5 showing the switch contact cam bars for actuating various switches.

As shown in Figs. 5 and 7, the lower end of the piston rod 68 extends from the bottom of the cylinder 70 and has attached thereto a bar 77 of rectangular cross section to which are attached switch contact bars 78, 79 and 80 which cooperate to trip the limit switches 81, 82 and 83 mounted on brackets 84 attached to the bottom of the plate 36 to open and close various electric circuits as will later be described. The switch contact bars are provided with slots 85 so that they may be adjusted by manipulating the screws 86 to move the switch contact bars along the bar 77 to predetermined positions to time the electrical circuit controlling the valve 71 so that the spread of the arms 58 may be controlled to hold tires of various bead diameters.

The piercing mechanism, as best illustrated in Figs. 4, 5 and 6, is carried into and out of operative position by the arms 58 and coordinated therewith to operate when the arms are fully expanded and engaging a tire.

The piercing or venting mechanism is composed of fluid pressure cylinders 87 mounted on the arms 58. Double acting pistons 88 within cylinders 87, have attached thereto piston rods 89 to the upper ends of which are attached chucks 90. The chucks are of the well-known type of split socket contracted by tapering threads of the nuts 91. In the chucks are securely held pointed pins or awls 92. Serving as a guard to prevent damage to the awls, lugs 93 projecting from the arms 58 are provided with an opening 94 through which the awls pass in their upward movement, but the pointed ends are enclosed in the openings when in their down inactive position.

When a tire is in position and securely engaged by the arms 58, an electric circuit functions to energize the solenoid 95 which depresses the plunger 96 of the 4-way valve 97. This supplies fluid under pressure to the conduit 98 leading to a manifold 99 which is provided with bores 100 and 101 in each end thereof which are separated by a partition 102. Ports 103 communicating with the bore 100 have connected thereto conduits 104 extending to the lower ends of the cylinders 87 to supply fluid under pressure to raise the pistons 88 and piston rods 89 to drive the awls 92 through the wall of the tire adjacent surfaces engaged by the arms 58, the other side of the cylinder being open to exhaust.

When the awls have reached their full stroke and the tire vented, an electric circuit energizes the solenoid 105 which depresses the plunger 96 in the opposite direction, opening the valve 97 to permit fluid to pass through the conduit 106 to the opposite end of the manifold block 99 through the ports 107 and conduits 108 which extend to the upper ends of the cylinders 87, the valve 97 opens the lower ends of the cylinders to exhaust, causing the awls to retract to their inactive position.

The venting units which are three in number are identical in construction and function, and are timed and controlled in the following manner.

The piston rods 89 extending through the bottom of the cylinders 87, have attached thereto switch contact bars 109 and 110 having cam surfaces thereon to operate and control a pair of limit switches 111 and 112, which are mounted in the extensions 60 extending from the lower end of the arms 58 (see Figs. 4, 5, 6 and 8).

When the arms 58 are fully expanded to securely engage a tire, the venting awls are actuated to pierce the tire by the limit switch 81 which is closed by the switch contact bar 78. This energizes the solenoid 95 which actuates the 4-way valve 97 to admit fluid to the lower end of the cylinders 87, causing the piston rods 89 to drive the awls 92 through the tire wall. The limit switches 111 and 112 operate as follows. The switches 111 (see Figs. 6 and 8), the arms of which are in contact with the high surface of the cam bars 109, are held in closed position and the switches 112 in contact with the high surface of the cam bar 110 are in open position. As the piston raises, the switches 111 leave the high surface of the cam bars 109 and open while the switches 112 remain open until the awls have completed their upward stroke and the contact arms of switches 112 with their contacts in series leave the high surfaces of the cam bars 110 and close. This completes a circuit to the solenoid 105 which reverses the 4-way valve 97 to retract the awls. When the awls are fully retracted, an electric circuit is set up by the limit switches 112 which energize solenoids 56 and 75, which reverses the fluid through the valves 52 and 71, permitting the arms 58 to retract and the carriage to be lowered. At the same time the solenoid 113 is energized to reverse the fluid pressure from the lower end of the cylinder 27 to the upper end, forcing the tire stop 35 to drop, passing another tire to the venting mechanism. When vents have been formed in the lower side of a tire, it is released, turned over and passed to unit 2 for venting the opposite side.

When a tire has been released by the arms 58 and the stop 35 has been lowered, the table conveyor is started. The tire having vents in its lower side passes to the lower end of the table conveyor, engaging a stationary bar 114 mounted on the frame 5 of the unit 1, said bar having a cross-sectional form of a hexagon or square so mounted that a corner of the bar will engage the sidewall of a tire to retard its forward movement so that the following tire will engage and push the vented tire. The frictional engagement of the tires and bar prevent the dropping of the tire until the forward or overhanging side of the tire is moved beyond its center with respect to the bar 114, whereupon the tire drops. The retarding action of the bar causes the tire to flip over with the unvented side down.

The tire drops on the intermediate inclined conveyor unit 3 which carries the tires from the venting unit 1 to the venting unit 2. The unit 3 is in the form of an inclined conveyor, comprising a frame 115, the lower end of which is attached to the frame 5 of unit 1, the elevated end being attached to the frame 5 of unit 2.

Mounted at the lower end of the frame 115, a pulley 116 is supported by a shaft 117. At the elevated end a shaft 118 supports a pulley 119 which is driven by a sprocket 120 mounted on the shaft 118 which in turn is driven by a chain 121 connected to a sprocket 122 mounted on a shaft 123 of a gear reduction unit 124 connected to and driven by the motor 125.

A pair of spaced apart belts 126 are supported by the pulleys 116 and 119 and driven thereby to carry the tires from unit 1 to unit 2, the belts being supported between pulleys by rollers 127. Mounted adjacent the lower end of the frame 115 and between the belts is a series of free revolving rollers 128 mounted in a frame 128a attached to the frame 115. These rollers assist in turning the tires over as they leave unit 1, the rollers being located so that the tires drop thereon to permit the contacting surface of the tire to roll over the rollers downward or backward so that the unvented underside of the tires may be exposed to the venting mechanism of unit 2.

The inclined transfer conveyor controlled by a push button switch 129 runs continuously while the units 1 and 2 are in operation.

Tires are delivered to the table roller conveyor of unit 2 by the inclined conveyor where they are vented in the opposite side by mechanism which is identical with the mechanism of unit 1. When both sides of tires are vented they are released from unit 2, requiring no turning. They are guided into a chute 130 by a baffle plate 131, from where they are received by a conventional hook conveyor to continue their course in the conveyor system.

*Operation*

The operation of the apparatus is as follows:

To start the apparatus the start button of switch 129 is depressed. This starts the inclined conveyor between the units 1 and 2. This conveyor runs continuously while the apparatus is in operation. The start buttons of switches 132 of each unit are depressed energizing motors 17 which start the conveyors. The apparatus is now ready to operate.

Since the operation of both units 1 and 2 is identical, only one will be explained.

A tire is fed to unit 1. The tire travels over the conveyor rollers 6 and 7 and depresses the swinging roller 18, causing the projection 21 extending from the arm 30 to contact an arm 22 extending from a switch 23. The normally closed contact of the switch 23 opens, de-energizing the motor 17 to stop the roller conveyor and de-energizing the solenoid 113 and at the same time a circuit is set up to energize solenoid 24 to raise the tire stop 35.

The normally open contact of switch 23 closes energizing solenoid valve 53 and 24. Solenoid valve 24 actuates the 4-way valve 25 to supply fluid to the lower end of the cylinder 27 through the conduit 26 and opens the upper end to exhaust through conduit 133 to raise the stop 35 so that the succeeding tires will be held back while the preceding tire is vented. At the same time solenoid 53 is energized which opens the valve 52 to admit fluid to the lower end of the cylinder 38 and opens the upper end to exhaust, causing the rack 41 to raise the tire holding and piercing mechanism through the action of the rack 41 and pinion 42.

When the rack 41 reaches its uppermost position, it contacts the arm of limit switch 134. The normally closed contact of switch 134 opens, de-energizing solenoids 24 and 53. However, the valves 25 and 52 remain in the same position, holding the rack and stop in their upward position.

The normally open contact of switch 134 closes energizing solenoid valve 72 through the normally open contact of limit switch 82 which is held closed since the jaws 58 are fully retracted. Solenoid 72 operates the 4-way valve 71 to supply air to the lower end of the fluid pressure cylinder 70 and opens the upper end to exhaust, causing the arms to expand. When the arms reach a predetermined diameter, the contact bar 79 rides out of contact with the arm of switch 82 and returns to its normal open position, causing the normally open contact of switch 82 to de-energize solenoid 72. However, the valve 71 remains in the same position and the arms continue to expand to grip the bead of a tire as in Fig. 5.

The normally closed contact of limit switch 82 closes, energizing a time delay relay with timing action occurring when a coil is energized, the normally open time contact of which energizes the solenoid 95 which supplies fluid to the lower end of the cylinders 87 and opens the upper end to exhaust. This actuates the awls 92 to vent a tire.

This circuit is set up to vent tires having bead diameters within certain limits. If a tire passes through having a bead diameter greater than that for which the circuit is set, limit switch 81 leaves the high surface of the contact bar 78 and returns to its normal position by passing the solenoid 95 and the normally closed contact of limit switch 81 closes, energizing a relay, causing the cycle to continue without actuating the awls.

When the awls have reached their full stroke, the contact bars 109 which have been operating the limit switches 111 have ridden out of contact with the switch arm and return to their normally closed position. The switches are wired in series and energize a relay which seals itself through a normally closed relay contact, which opens a circuit to solenoid valves 24, 53, 72 and 95 and a time delay relay which causes another normally closed contact to open a circuit to a relay which, when de-energized, its normally closed contact connects solenoids 56, 75 and 105 and a time delay relay, which energizes solenoid 105 to retract the awls.

When the awls are fully retracted, limit switches 112 which are also wired in series and normally held open are closed by the contact bars 110, energizing solenoid 75 which reverses the fluid in the cylinder 70, causing the arms 58 to retract.

When the arms are fully retracted, limit switch 83 operates. Its normally closed contact is opened by the high surface of the contact bar 80 de-energizing solenoid 75 which has operated to retract the arms 58.

The normally open contact of limit switch 83 closes to energize solenoid 56 which reverses the fluid in cylinder 38 to actuate the rack 41 and pinion 42 to lower the carriage on which the tire holding and venting mechanisms are mounted.

When the rack is lowered and the carriage in its lowermost position, the lower end of said rack contacts a limit switch 135 which operates so that its normally closed contact opens, de-energizing solenoid 56 and a time delay relay. The normally open contact of limit switch 135 closes, energizing a relay, the normally open contact of which energizes the motors 16, which starts the roller conveyor and lowers the tire stop 35 by energizing solenoid 113. The cycle is now ready to be repeated.

*Wiring diagram*

Since the operation of both units 1 and 2 are identical and operate independently of one another, the controlling elements for each unit are the same as illustrated in the wiring diagram of Fig. 9.

The electric current is supplied by the feed lines 136, 137 and 138, which carry 440 volts for operation of the motors 17 and 125, the lines being provided with the customary fused switches 139.

For the operation of the electric controls, the 440 v. current is transformed to 220 volts by a transformer 140, the 220 volt current being supplied to the controlling elements from the transformer through the feed line 141, then through the return line 142.

To set the apparatus so that controlling elements will function in their sequential order, the switch 129 in line 143 is pressed energizing relay 144 which closes the contact 144a in line 145a. The relay 144 in line 145 closes a circuit through the lines 145 and 146 which leads through the overload switches to line 142, closing the contacts 147, 148 and 149 in lines 150, 151 and 152, respectively, which starts the motor 125 which runs the inclined intermediate conveyor 3. To stop the conveyor, switch 129a is pressed, de-energizing relay 144.

When the relay 144 is energized by closing the switch 129, the contact 153 in line 154 closes, which energizes the relay 155 also in line 154. The relay 155 in turn closes contact 156 in line 157. When the push button switch 132 in line 158 is closed it energizes time relay 160 in line 161 which in turn closes the contact 162 in line 163 which energizes relay 164 in line 165 through line 166. The relay 164 in turn closes the contact 167 in line 165 which completes the circuit to line 142, closing the contacts 168, 169, 170 in lines 171, 172 and 173, respectively, to motor 17 which starts the rollers on the table conveyor to convey a tire into position to be vented.

The motor 17 for conveyor unit No. 2 is started in the same manner by identical controls when the push switch 132 of No. 2 unit is closed, causing the contacts 174, 175 and 176 in the lines 177, 178 and 179 to close, energizing the motor 17 which drives the conveyor of unit 2.

The first half or venting cycle of either unit is operated by the controls as follows.

A tire travels over the table conveyor to a position above the venting mechanism when it depresses the pivotally mounted roller 18 which is supported by arms 19. An extension 21 on arm 30 contacts the arm of a limit switch 23 in line 165 leading from the feed line 141. The normally closed contact of limit switch 23 opens, de-energizing relay 164 and solenoid 53. This stops the conveyor and sets up the current so that solenoid 24 is energized.

The normally open contact of limit switch 23 closes, directing current through the line 180 to normally closed switch 134 through lines 181, 182 and 183 to solenoid 24 which operates a 4-way valve 25 to direct fluid to the lower end of cylinder 27 to raise the stop 35. At the same time, current is directed through line 181 to solenoid 53 actuating a 4-way valve to direct fluid to the lower end of cylinder 38 to raise the carriage which supports the tire holding and piercing mechanism.

When the carriage is raised, the upper end of the rack 41 contacts the normally closed switch 134 which breaks the circuit in line 181, de-energizing solenoids 24 and 53. This leaves the tire stop 35 and the carriage in their upper position.

The normally open contact of limit switch 134 closes, directing current through the line 184 to limit switch 82 which is held closed since the arms 58 are held at their minimum diameter in contracted position.

The normally open contact of limit switch 134 operated by the rack closes, through the line 184 and through the normally open contact of limit switch 82 in line 185, energizing solenoid 72 which actuates the 4-way valve 71 to direct fluid to the lower end of the cylinder 70 to expand the arms 58. The limit switch 82 is operated by a cam or contact bar 79 attached to the lower end of piston rod 68. When the contact bar rides out of contact with the arm of switch 82, the arms are in their expanded position to hold a tire while being pierced and the switch 82 returns to its normal closed position, de-energizing solenoid 72. When the arms are fully expanded, cam bar 78 is in contact with limit switch 81 and closes its normally open contact. The normally closed contact of switch 82 directs current through line 186 through limit switch 81 with its normally open contact held closed by the cam bar 78 and to time delay relay 188 with timing action occurring when its coil is energized. The normally open time contact of time delay relay 188 is used to energize solenoid 95 by closing the contact 189 in line 190. The solenoid 95 actuates the valve 97 to supply fluid to the lower end of the cylinders 87 which actuate the awls to pierce the tire.

If a tire has a bead diameter greater than that for which the machine is set, the arms expand until they reach the limit for which they were set. The switch 81 then rides off the cam bar 78 and returns to its normally closed position by-passing solenoid 95, the normally closed contact of switch 81 energizing relay 191 in line 192. The cycle continues without actuating the awls.

When tires of the correct bead diameter pass through, the time relay 188 times in its normally open time contact 189 which closes energizing solenoid 95 which actuates a 4-way valve which applies fluid to the lower end of the cylinders 87 operating the awls to pierce the tire, forming the desired vents therein.

The second or return cycle is controlled as follows:

When the awls have reached full stroke, the contact or cam bars 109 ride out of contact with the arms of switches 111. The switches return to their normal closed position. These switches are normally closed with their contacts wired in series which energize time relay 191 which seals itself in through a normally closed contact 193 in line 192 by closing the normally open contact 194. Relay 191 also closes the normally open contact 195 in line 196 and opens the normally closed contact 197 in line 198 which cuts off the circuit operating the controls for the first or venting cycle.

This sets up the circuit so that the circuit is open to deenergize solenoids 53, 24, 72, 95 and time relay 188. Another normally closed contact of 191 opens contact 207 in line 199 which opens the circuit to relay 200 in line 201 which, when de-energized, its normally closed contact connects solenoids 105 in line 196, 75 in line 204, 56 in line 157 and time delay relay 160 in line 161 to return line 142 by closing the contact 205 in line 206.

A normally open contact 195 of relay 191 in line 196 closes energizing solenoid 105 which reverses the fluid pressure in the awl cylinders 87. When the awls contract the contact bars 110 which operate switches 112, the raised portion of said bars ride into contact with the normally open switch arms closing the switches 112 in line 204, energizing solenoid 75 which reverses the fluid pressure in cylinder 70 which contracts the arms.

When the arms are fully contracted, limit switch 83 is operated by the cam bar 80 which opens the normally closed contact of limit switch 83 in line 204, de-energizing solenoid 75. The normally open contact of limit switch 83 closes by riding out of contact with bar 80. The contact 156 is closed by relay 155 energizing solenoid 56 and time delay relay 160. Solenoid 56 reverses the fluid pressure in cylinder 38, causing the carriage to be lowered through the action of the rack and pinion operated by the fluid pressure cylinder 38.

When the rack reaches its down position, the lower end thereof contacts limit switch 135 in line 157 to open its normally closed contact, de-energizing solenoid 56 and time delay relay 160.

The normally open contact of limit switch 135 closes, energizing relay 164 through time delay relay 160 and the normally open time relay contact 162 of relay 160 starting the motor by the delayed closing of the time delay contact 162 in line 163, completing the circuit through line 166 to the relay 164, starting the conveyor, at the same time energizing solenoid 113 in line 209 which reverses the fluid pressure in the cylinder 27 to lower the tire stop. The tire stop is lowered by the circuit energized by the relay 155 which closes the contact 156 in line 157 to lines 208 and 209. This energizes solenoid 113 which reverses the fluid pressure in the cylinder 27, causing the tire stop 35 to be lowered.

The normally open contact 164a in line 214 of relay 164 in line 165 closes energizing the relay 200 in line 201 which then seals itself through contact 210 of relay 200 and normally closed contact 207 in line 201 opening the contact 205 in line 206 so that there will be no interference from the second cycle when the first cycle is in progress. The first cycle is now ready to repeat.

A time delay relay is provided to delay the unit when the take-away conveyor is full and can receive no more tires. The limit switch 211 in line 212 is operated to energize the time delay relay 213 which times out its normally closed time contact, de-energizing relay 155 in line 154. The normally open contact of relay 155 opens the circuit by opening the contact 156 in line 157 which opens the circuit to solenoids 56 and 113 and time delay relay 160 so that the cycle in progress proceeds to this point and stops until the take-away conveyor is cleared.

From the foregoing it will be recognized that the various objects of my invention have been achieved by the provision of an apparatus controlled automatically, to vent the sides of tire casings adjacent their bead portions to relieve air that becomes trapped between the inner walls of the casings and the inner tube to prevent air from finding its way between the various plies of fabric of which the tires are constructed. The trapped air is thus permitted to escape, preventing ply separation and premature destruction of tire casings in the form of blowouts.

That the apparatus efficiently eliminates an undesirable fatiguing operation heretofore performed by hand, is apparent.

While certain representative embodiments and details have been shown for the purpose of illustrating the invention, it will be apparent to those skilled in this art that various changes and modifications may be made therein without departing from the spirit or scope of the invention.

I claim:

1. Apparatus for venting automobile tire casings and the like, embodying means for receiving a tire casing, means for positioning and engaging a tire casing, means associated with said positioning and engaging means to pierce vents in the side of a tire casing, means for releasing the casing when pierced, means for reversing a tire casing upside down onto a conveyor means to carry said tire casing to a second apparatus embodying means corresponding to the above-recited means to pierce vents in the opposite side of a tire casing, and means associated with the second apparatus to discharge said tire casing.

2. An apparatus for piercing the sidewalls of tire casings to provide a plurality of vents in each side thereof, embodying a first unit to receive and position a tire casing, means for engaging and holding a tire casing, means associated with said engaging and holding means to pierce one side of a tire casing, means to reverse a casing upside down, means for conveying said tire casings to a second unit to pierce vents into the opposite side of a casing and means associated with said second unit to discharge a tire.

3. In an apparatus for piercing air vents in the walls of the outer casing of pneumatic tires, embodying a first unit to pierce a plurality of vents in one side of a tire casing; a second unit to pierce vents in the opposite side of a casing; and an intermediate conveyor unit to carry said tire casings from said first unit to said second unit, said first and second units embodying means for receiving and positioning a tire casing, means for engaging and holding a casing, awl means for piercing a plurality of vents in the walls of a tire casing, means associated with said first unit to reverse the tire casing upside down and means associated with said second unit to receive the casing when both sides have been vented.

4. In an apparatus for piercing the sidewalls of tire casings to provide air vents in the sidewalls thereof to permit trapped air to escape therethrough, embodying a first unit for receiving a tire casing, means for centering and engaging a casing to hold same while being vented, means associated with said centering and engaging means to pierce one side of a tire casing, means for releasing and reversing a casing upside down, conveyor means for receiving and delivering the tire casing to said second unit embodying like means to pierce the opposite side of the tire casing, and means associated with said second unit to release and discharge the casing.

5. In an apparatus for piercing the sidewalls of pneumatic tire casings to provide vents therein to permit the escape of trapped air therefrom when a tire containing an inner tube is mounted on a rim and inflated, embodying a first unit for piercing one side of a casing; a second unit for piercing the opposite side; and an intermediate conveyor unit to carry casings from said first unit to said second unit, the first and second units embodying a roller conveyor to receive and position the tire casings, motor means for driving said roller conveyor, a pivotally mounted roller means actuated when engaged by a casing to stop said roller conveyor when a casing is in position, fluid pressure operated arms for centering and engaging a tire casing, fluid pressure actuated awls associated with said arms to pierce the casing, means associated with the first unit to reverse said tire casings upside down onto said intermediate conveyor unit which embodies a pair of spaced apart belts, motor means for driving said belts and means comprising a series of rollers disposed between said belts to aid in presenting the reverse side of a tire casing to the venting awls of said second unit.

6. In an apparatus for piercing the sidewalls of pneumatic tire casings and the like to provide vents therein to permit the escape of air trapped between the inner wall of the casing and the inner tube when mounted on a rim and inflated, embodying a first unit for receiving and venting one side of a casing; a second unit for venting the opposite side of a casing and discharging same; and an intermediate conveyor unit for carrying casings from said first unit to said second unit, said first and second units embodying a roller table conveyor, motor means for intermittently driving said conveyor, a pivoted roller means actuated when engaged and depressed by a tire casing to stop said conveyor when a casing is in position to be vented, a fluid pressure actuated stop to hold back succeeding tires when a casing is in venting position, fluid pressure actuated arms to engage the bead of the casing to hold said casing while being vented, fluid pressure actuated awls associated with said arms to pierce the vents in the casing, and a carriage means to position said bead engaging and piercing means.

7. Apparatus for piercing the sidewall portions of an automobile tire casing comprising at least one unit embodying a piercing means, means for supporting and holding the casing to be pierced with one of its sidewall portions exposed to the piercing means and means for turning the tire casing over to expose the opposite sidewall portion of the casing to the piercing means.

8. Apparatus for piercing the sidewall portions of an automobile tire casing, comprising a pair of units disposed in succeeding relation, each of said units comprising means for piercing one of the sidewall portions of the tire casing and means for supporting and holding the casing with a sidewall portion thereof exposed to the piercing means and disposed between the piercing units, means for turning the casing over to expose the opposite sidewall portion to the piercing means of the succeeding unit and means for transporting the casing thereto.

9. An apparatus for piercing the sidewall portions of an automobile tire casing to form vents therein to permit trapped air between the inner walls of the tire casing and the inner tube to escape when mounted on a rim and inflated, embodying a pair of piercing units disposed in succeeding relationship, each of said units comprising conveyor means for receiving and supporting a tire casing, means on said conveyor to stop same when a tire casing is in position to be vented, means associated with said conveyor means to stop and hold back succeeding tire casings, arm means pivotally mounted in pedestals for engaging the bead portion of a tire casing, means for expanding and contracting said arm means, venting means carried by said arm means, a carriage means for moving said casing engaging and venting means into and out of position and means for actuating said carriage.

10. An apparatus according to claim 9 in which the conveyor means comprises a frame, idler rollers disposed at the ends of said frame, intermediate rollers supported substantially centrally on said frame, auxiliary rollers positioned beneath said centrally disposed rollers and interpolated therewith, a pair of belts adjacent the ends of said rollers and positioned between the interpolated rollers and said intermediate rollers and pulley means for driving said belts.

11. An apparatus according to claim 9 in which the conveyor stop means comprises pivotally mounted arms, a roller mounted on said arms, said roller being normally disposed in a higher plane than the adjacent rollers, an arm having a projection extending therefrom, said projection contacting an arm of a limit switch when a tire casing depresses said roller which opens an electric circuit to a motor to stop the conveyor.

12. An apparatus according to claim 9 in which the tire stop comprises an arm, a bar attached to said arm, a piston rod attached to said arm, a double acting piston within a fluid pressure cylinder to actuate said piston and a solenoid operated valve to actuate said cylinder.

13. An apparatus according to claim 9 in which said arm means embodies a plurality of arms, gripping surfaces formed on said arms, and expanding means for expanding said arms radially.

14. An apparatus according to claim 13 in which the expanding means embodies a piston rod, a spider block mounted on said piston rod, links connecting said spider block with the arms and means for actuating said piston rod.

15. An apparatus according to claim 14 in which the piston actuating means comprises a fluid pressure cylinder, a double acting piston within said cylinder, said piston fixed to said piston rod and a solenoid valve to actuate said fluid pressure cylinder.

16. An apparatus according to claim 9 in which the piercing means carried by said arms embodies a plurality of fluid pressure cylinders, solenoid actuated valves for actuating said fluid pressure cylinders, double acting pistons within said cylinder, piston rods extending from said cylinders actuated by said pistons, chucks fixed to the ends of said piston rods, and awls secured in said chucks to pierce vents in the tire casings.

17. An apparatus according to claim 9 in which the carriage means comprises a shaft, a pair of arms pivotally mounted on said shaft, a plate disposed on said arms, pedestals mounted on said plate to support the tire engaging arms and means to actuate said carriage.

18. An apparatus according to claim 17 in which the carriage actuating means comprises a shaft, crank arms mounted on said shaft, arms pivotally connected to said crank arms, said arms extending to and connected to the carriage, a pinion gear mounted on said shaft, a rack in engagement with said pinion gear and fluid pressure means to actuate said rack.

19. An apparatus according to claim 18 in which the fluid pressure means comprises a fluid pressure cylinder, a double acting piston within said cylinder, a piston rod fixed to said piston, said piston extending to said rack and fixed thereto and solenoid operated valve to actuate said piston within the cylinder.

20. An apparatus for piercing the sidewalls of tire casings for providing vents in each side thereof embodying a first unit and a succeeding unit, each of said units comprising means for receiving and positioning a tire, means for temporarily halting the receiving and positioning means when a tire is positioned, means for holding back succeeding tires, means for engaging the bead portion of a positioned tire, means on the bead engaging means for piercing the sidewall of a tire to form vents therein and control means electrically energizable for actuating the several aforesaid means according to a predetermined cycle of operations.

HAROLD H. CLARK.

REFERENCES CITED

The following references are of record in the file of this patent:

UNITED STATES PATENTS

| Number | Name | Date |
|---|---|---|
| 2,453,681 | Temple | Nov. 9, 1948 |